(12) United States Patent
Oota

(10) Patent No.: US 8,462,351 B2
(45) Date of Patent: Jun. 11, 2013

(54) MEASUREMENT METHOD AND MEASUREMENT APPARATUS

(75) Inventor: Tetsuji Oota, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 343 days.

(21) Appl. No.: 12/859,789

(22) Filed: Aug. 20, 2010

(65) Prior Publication Data

US 2011/0043809 A1 Feb. 24, 2011

(30) Foreign Application Priority Data

Aug. 20, 2009 (JP) .................. 2009-191474

(51) Int. Cl.
*G01B 11/02* (2006.01)

(52) U.S. Cl.
USPC ........................................ 356/515

(58) Field of Classification Search
USPC ................................ 356/513–516
See application file for complete search history.

(56) References Cited

U.S. PATENT DOCUMENTS 2,629,283 A * 2/1953 Zobel ........................... 356/518

FOREIGN PATENT DOCUMENTS

JP 11-325818 A 11/1999
JP 2002-214076 A 7/2002

OTHER PUBLICATIONS

Schwesinger,Gerhard "Optical Effect of Flexure in Vertically Mounted Precision Mirrors", Journal of the Optical Society of America, vol. 44, No. 5, pp. 417-424, May 1954.

* cited by examiner

*Primary Examiner* — Tari Fur Chowdhury
*Assistant Examiner* — Jonathon Cook
(74) *Attorney, Agent, or Firm* — Rossi, Kimms & McDowell, LLP

(57) ABSTRACT

The present invention provides a measurement apparatus including a reflector configured to reflect a light traveling from an optical system, a detector configured to detect a light incident thereon via the reflector and a measurement optical system including one of a reference surface and a wavefront conversion element, and a load application device configured to apply a load to the reflector in an application direction perpendicular to the optical axis, the load application device applying a compression load to a first portion of the reflector below the optical axis, at a magnitude corresponding to an angle and a position of the first portion, in the application direction thereat, and applying a tension load to a second portion of the reflector above the optical axis, at a magnitude corresponding to an angle and a position of the second portion, in the application direction thereat.

7 Claims, 8 Drawing Sheets

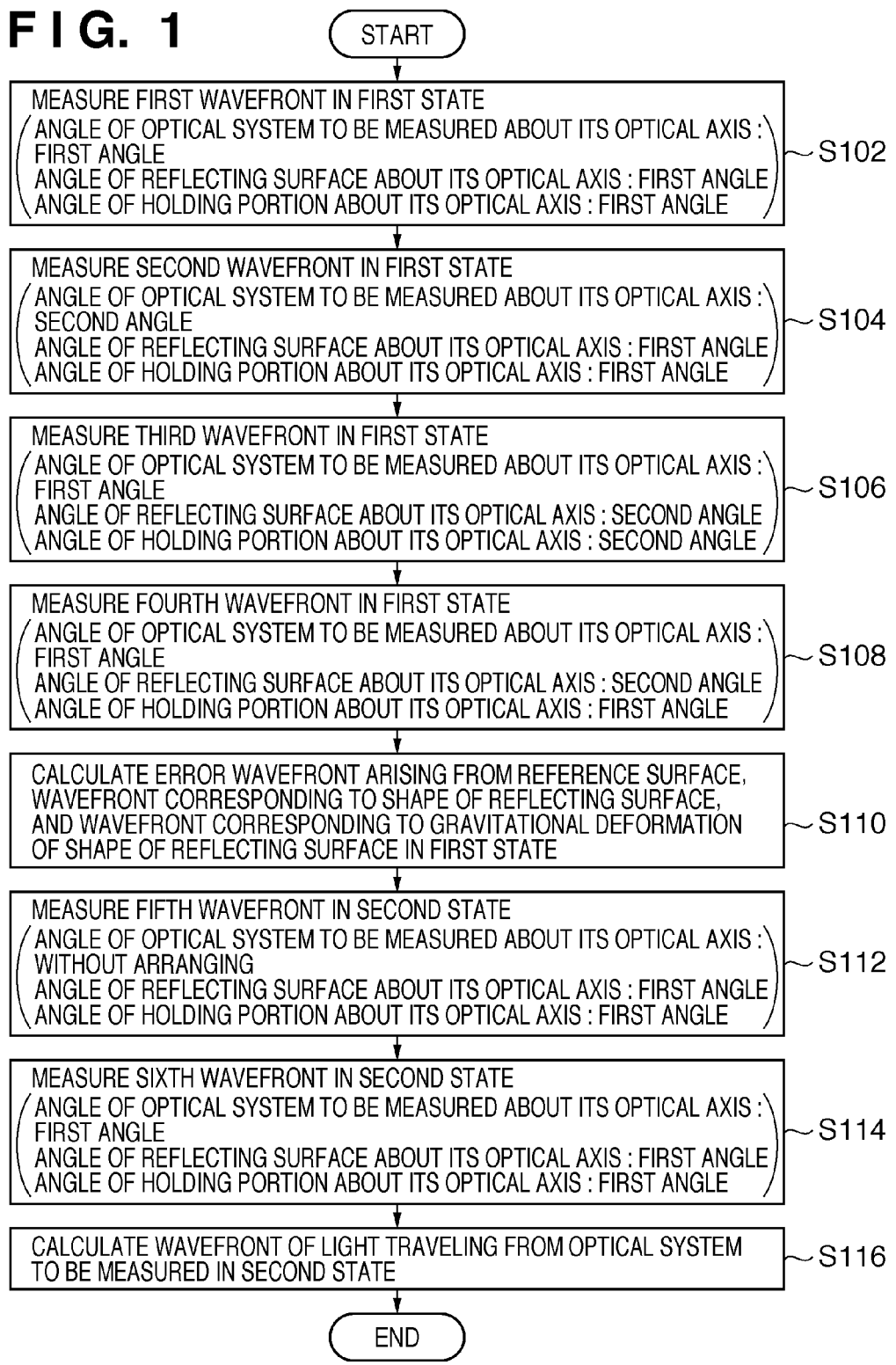

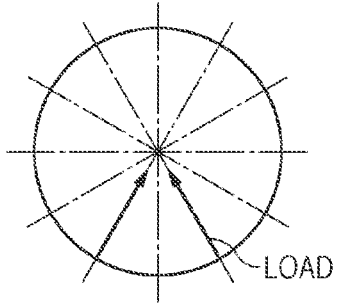
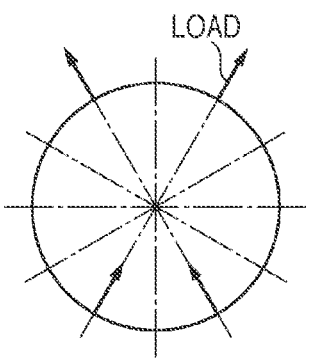
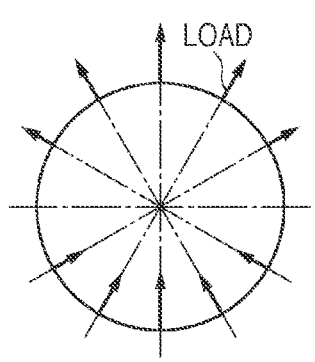
FIG. 5A  FIG. 5B  FIG. 5C
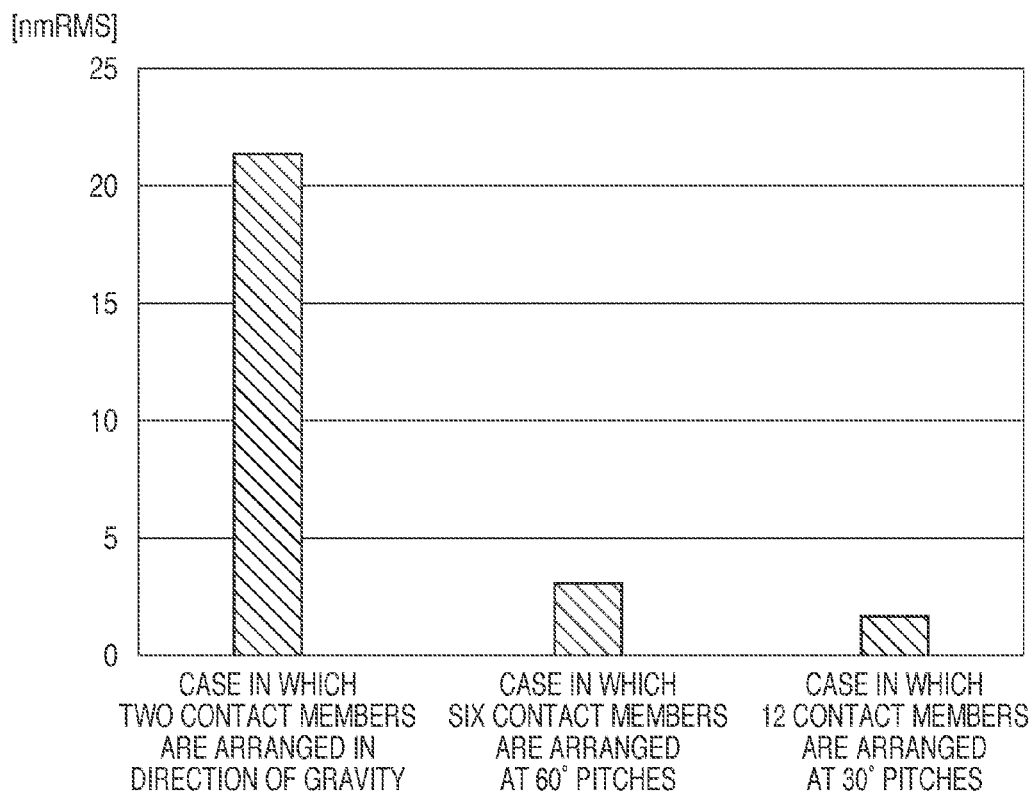
FIG. 5D

MEASUREMENT METHOD AND MEASUREMENT APPARATUS

BACKGROUND OF THE INVENTION

1. Field of the Invention

The present invention relates to a measurement method and measurement apparatus.

2. Description of the Related Art

An optical observation apparatus (for example, astronomical telescope) for an observation target whose position is not constant generally changes its attitude to track the observation target. The direction of gravity is constant regardless of the attitude of the observation apparatus. As the attitude of the observation apparatus changes, deformation of the optical system of the observation apparatus by the gravity changes (that is, the optical performance of the optical system changes).

The optical system, which forms the observation apparatus such as an astronomical telescope, is roughly divided into a primary mirror that collects observation light, and a correction optical system that corrects aberration. A change of the optical performance of the optical system caused by a change of the attitude of the observation apparatus is obtained in advance. Then, for example, the relative distances between a plurality of optical elements which form the correction optical system are adjusted. The optical performance of the observation apparatus can therefore be adjusted to a predetermined value. To adjust the optical performance of the observation apparatus with high precision, it is indispensable to accurately measure the optical performance (for example, wavefront aberration (transmission wavefront aberration)) of the correction optical system.

An interferometer is generally used to measure the wavefront aberration of the optical system (see Japanese Patent Laid-Open No. 2002-214076). In Japanese Patent Laid-Open No. 2002-214076, a reference surface, an optical system to be measured, and a reflecting surface are arranged to make their optical axes coincide with each other. The wavefront aberration of the optical system to be measured can be measured by detecting the interference pattern of light which has been reflected by the reference surface, and one which has passed through the reference surface and the optical system to be measured and has been reflected by the reflecting surface. At this time, the light reflected by the reflecting surface contains a wavefront unique to the reference surface, the gravitational deformation of the reference surface, a wavefront unique to the reflecting surface, and the gravitational deformation of the reflecting surface. A wavefront error unique to the interferometer other than that caused by the optical system to be measured will be defined as the system error of the interferometer (measurement apparatus). In Japanese Patent Laid-Open No. 2002-214076, a system error arising from the reflecting surface is calibrated (separated) by rotating the reflecting surface about its optical axis. When a system error arising from the reference surface and that arising from the reflecting surface are separated, correction can be done at different magnifications for the NA (Numerical Aperture) of the reference surface and that of the reflecting surface. Hence, the system error can be calibrated with higher precision.

A technique has also been proposed, to hold an optical element so that its optical axis becomes perpendicular to the direction of gravity, and measure the surface shape of the optical element (see Japanese Patent Laid-Open No. 11-325818). In Japanese Patent Laid-Open No. 11-325818, an optical element to be measured and a reference optical element are suspended using belts to reduce the gravitational deformations of the optical elements depending on the attitude.

It is also reported that loads having a cosine distribution along the normal of an optical element are added to the periphery of the optical element to cancel the in-plane gravity component of the optical element, thereby reducing the gravitational deformation of the optical element (see Schwesinger G., "Optical Effect of Flexure in Vertically Mounted Precision Mirrors", Journal of the Optical Society of America, Vol. 44, pp. 417-424, 1954 (reference 1)).

However, in Japanese Patent Laid-Open No. 2002-214076, when the optical axis of a measurement apparatus (optical system to be measured) does not coincide with the direction of gravity, the system error cannot be calibrated. This is because even when the reflecting surface is rotated, the gravitational deformation components of the reference surface and reflecting surface do not follow the rotation of the reflecting surface.

When an optical element is suspended using a belt, like Japanese Patent Laid-Open No. 11-325818, uniform loads are added along the normal of the optical element to a periphery (lower half) in the direction of gravity out of the periphery of the optical element. It is difficult to say that the in-plane gravitational deformation of the optical element is effectively reduced. Note that the purpose of Japanese Patent Laid-Open No. 11-325818 is to reduce the gravitational deformation of an optical element when the optical element is held so that its optical axis becomes perpendicular to the direction of gravity. This technique cannot be applied to a case in which the optical axis forms various angles with respect to the direction of gravity, like a correction optical system used in an observation apparatus such as an astronomical telescope.

Reference 1 does not disclose a concrete arrangement for adding loads having a cosine distribution along the normal of an optical element. This technique cannot be directly applied to, for example, measurement of the wavefront aberration of the correction optical system used in the observation apparatus.

SUMMARY OF THE INVENTION

The present invention provides a technique which is advantageous in terms of precision of measuring of wavefront aberration of an optical system whose optical axis is arranged in a direction different from a gravity direction.

According to one aspect of the present invention, there is provided an apparatus which measures a wavefront aberration of an optical system, the apparatus including a reflector configured to reflect a light traveling from the optical system, an angle of an optical axis of the reflector being variable relative to a gravity direction, a measurement optical system configured to include one of a reference surface and a wavefront conversion element, a detector configured to detect a light incident thereon via the reflector and the measurement optical system including the one, and a load application device configured to apply a load to the reflector in an application direction perpendicular to the optical axis, the load application device applying a compression load to a first portion of the reflector below the optical axis, at a magnitude corresponding to the angle and a position of the first portion, in the application direction thereat, and applying a tension load to a second portion of the reflector above the optical axis, at a magnitude corresponding to the angle and a position of the second portion, in the application direction thereat.

Further aspects of the present invention will become apparent from the following description of exemplary embodiments with reference to the attached drawings.

BRIEF DESCRIPTION OF THE DRAWINGS

FIG. 1 is a flowchart for explaining a measurement method as one aspect of the present invention.

FIGS. 5A to 5D are views showing the results of analyzing the effect of holding a reflecting member by a holding portion and load adding portion (that is, reduction of the gravitational deformation of a reflecting surface) in the measurement apparatus shown in FIGS. 4A to 4D.

DESCRIPTION OF THE EMBODIMENTS

Figure 2A:
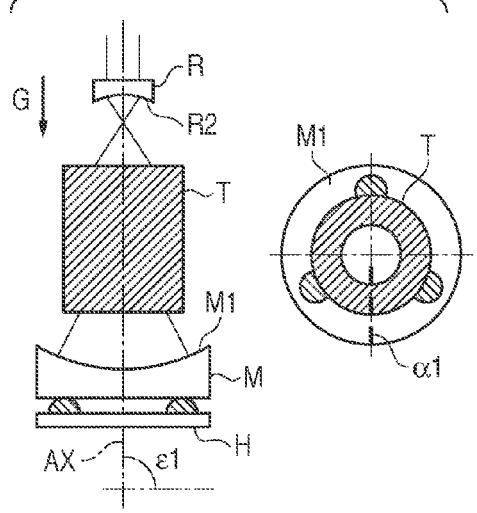
FIGS. 2A to 2D are schematic views showing states of a measurement apparatus used in the measurement method as one aspect of the present invention.

Preferred embodiments of the present invention will be described below with reference to the accompanying drawings. Note that the same reference numerals denote the same members throughout the drawings, and a repetitive description thereof will not be given.

FIG. 1 is a flowchart for explaining a measurement method as one aspect of the present invention. FIGS. 2A to 2D and 3A to 3D are schematic views showing states of a measurement apparatus (states of the measurement apparatus in respective steps of the flowchart shown in FIG. 1) used in the measurement method as one aspect of the present invention. The measurement method of the embodiment measures the wavefront (wavefront aberration) of light traveling from an optical system to be measured. As will be described later, even when the optical axis of the optical system to be measured does not coincide with the direction of gravity, the wavefront of light traveling from the optical system to be measured can be measured with high precision. The measurement method of the embodiment is suitable for measurement of the wavefront when the optical axis forms various angles with respect to the direction of gravity, like a correction optical system used in an observation apparatus such as an astronomical telescope. As shown in FIGS. 2A to 2D and 3A to 3D, the measurement apparatus has a general interferometer arrangement. More specifically, the measurement apparatus includes a reflecting member M having a reflecting surface M1 which reflects light traveling from an optical system T to be measured, a holding portion H which holds the reflecting member M, a reference optical system R (measurement optical system) having a reference surface R2, and a detecting portion (not shown) having a detecting surface for detecting an interference pattern. In the embodiment, the optical system T to be measured, reflecting member M, and holding portion H are configured to be able to change their angles about their optical axes. For example, the measurement apparatus includes a rotation mechanism which rotates the optical system T to be measured, reflecting member M, and holding portion H about their optical axes.

In S102 (first step), as shown in FIG. 2A, the measurement apparatus is set to the first state, and measures a wavefront (first wavefront) W1 of light traveling from the optical system T to be measured. Note that the first state is a state in which the attitude of the measurement apparatus is controlled so that the optical axes AX of the reflecting surface M1 and reference surface R2 coincide with the direction G of gravity. In other words, in the first state, an angle ϵ1 formed by the optical axis AX and a plane perpendicular to the direction of gravity is 90°. In the first state, the optical system T to be measured is arranged in the measurement apparatus so that the optical axis AX serving as the reference axis of the optical system T to be measured coincides with the direction G of gravity. In S102, the angle of the optical system T to be measured about its optical axis, that of the reflecting surface M1 about its optical axis, and that of the holding portion H about its optical axis are set to a first angle $\alpha 1$. Note that the first angle $\alpha 1$ may be an arbitrary angle or predetermined angle.

Measurement of the wavefront of light traveling from the optical system T to be measured will be explained. Light emitted by a light source (not shown) enters the reference optical system R and is split into light reflected by the reference surface R2 and one which passes through the reference surface R2 and enters the optical system T to be measured. The light which has entered the optical system T to be measured passes through it and is reflected by the reflecting surface M1 of the reflecting member M. The light reflected by the reflecting surface M1 passes through the optical system T to be measured along the same optical path, and enters the reference optical system R. An interference pattern of the light which has been reflected by the reflecting surface M1 and one which has entered the reference surface R2 (interference fringes arising from the difference in optical aberration between the light which has been reflected by the reflecting surface M1 and one which has entered the reference surface R2) is formed on the detecting surface of the detecting portion. The detecting portion detects the interference pattern, thereby measuring the wavefront (wavefront aberration contained in the light traveling from the optical system T to be measured).

The first wavefront W1 contains not only the wavefront aberration WT($\alpha 1$) of the optical system T to be measured at the first angle $\alpha 1$, but also the wavefront aberration WM($\alpha 1$) of the reflecting surface M1 at the first angle $\alpha 1$. The first wavefront W1 is therefore given by $$W1 = 2WR + 2WT(\alpha 1) + WM(\alpha 1) \quad (1)$$

In equation (1), the wavefront aberration WT($\alpha 1$) of the optical system T to be measured and the wavefront aberration WR of the reference optical system R are doubled, whereas the wavefront aberration WM($\alpha 1$) of the reflecting surface M1 is not doubled. This is because light passes through the optical system T to be measured and the reference surface R2 twice, but is reflected only once by the reflecting surface M1.

Letting FM be the shape of the reflecting surface M1, the wavefront WM of the reflecting surface M1 is given by $$WM = 2FM \quad (2)$$

As represented by equation (2), the wavefront WM of the reflecting surface M1 becomes double the shape of the reflecting surface M1 because light reciprocates (is reflected) with respect to the shape (concave/convex) of the reflecting surface M1.

The shape FM of the reflecting surface M1 is given by the sum of a shape (that is, wavefront corresponding to the shape of the reflecting surface M1) FMF unique to the reflecting surface M1 and a gravitational deformation (that is, wavefront corresponding to the gravitational deformation of the shape of the reflecting surface M1) FMG which changes depending on the state of holding by the holding portion H:

$$FM = FMF + FMG \tag{3}$$

Based on equations (2) and (3), equation (1) can be rewritten into $$WT(\alpha 1) = W1/2 - WR - (FMF(\alpha 1) + FMG(\alpha 1)) \tag{4}$$

From equation (4), the system error can be calibrated by separating an error wavefront (wavefront aberration) arising from the reference surface R2 and that arising from the reflecting surface M1.

When the wavefront aberration WR of the reference optical system R and the wavefront aberration of the reflecting surface M1 are separated, the respective wavefront aberrations can be individually calibrated. As described above, correction can be performed at different magnifications for the NA (Numerical Aperture) of the reference optical system R (reference surface R2) and that of the reflecting member M (reflecting surface M1). The system error can be calibrated with higher precision.

Figure 2B:
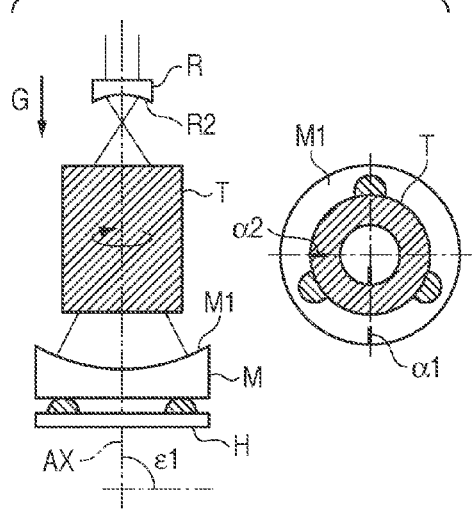

In S104 (second step), as shown in FIG. 2B, the optical system T to be measured is rotated about its optical axis to measure a wavefront (second wavefront) W2 of light traveling from the optical system T to be measured while the measurement apparatus is maintained in the first state. More specifically, in S104, the angle of the optical system T to be measured about its optical axis is set to a second angle $\alpha 2$ different from the first angle $\alpha 1$. The angle of the reflecting surface M1 about its optical axis, and that of the holding portion H about its optical axis are set to the first angle $\alpha 1$. Letting $WT(\alpha 2)$ be the wavefront aberration of the optical system T to be measured at the second angle $\alpha 2$, the second wavefront W2 is given by $$W2 = 2WR + 2WT(\alpha 2) + 2(FMF(\alpha 1) + FMG(\alpha 1)) \tag{5}$$

The wavefront aberration of the optical system T to be measured is different between equations (1) and (5). Since the optical system T to be measured is rotated about its optical axis, the measurement wavefront changes. The change of the wavefront is a component which has changed following the rotation of the optical system T to be measured, that is, the wavefront WT of the optical system T to be measured. The wavefront WT of the optical system T to be measured can therefore be separated from the measurement wavefront. When separating the wavefront WT of the optical system T to be measured, the wavefront aberration can be decomposed into normalized polynomials such as Zernike polynomials so that a change of a rotationally asymmetrical component corresponds to a change of the angle about the optical axis.

Figure 2C:
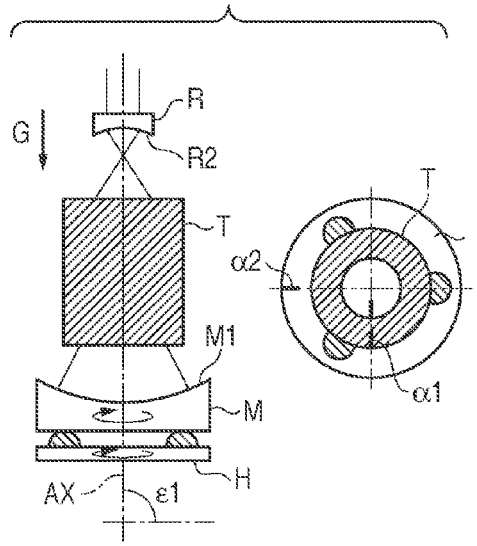

In S106 (third step), as shown in FIG. 2C, the reflecting surface M1 and holding portion H are rotated about their optical axes to measure a wavefront (third wavefront) W3 of light traveling from the optical system T to be measured while the measurement apparatus is maintained in the first state. Note that the positional relationship between the reflecting surface M1 and the holding portion H is kept unchanged. More specifically, in S106, the angle of the optical system T to be measured about its optical axis is set to the first angle $\alpha 1$. The angle of the reflecting surface M1 about its optical axis, and that of the holding portion H about its optical axis are set to the second angle $\alpha 2$. Letting $FMF(\alpha 2)$ and $FMG(\alpha 2)$ be the shape and gravitational deformation of the reflecting surface M1 at the second angle $\alpha 2$, the third wavefront W3 is given by $$W3 = 2WR + 2WT(\alpha 1) + 2(FMF(\alpha 2) + FMG(\alpha 2)) \tag{6}$$

The shape and gravitational deformation of the reflecting surface M1 are different between equations (1) and (6). Since the reflecting surface M1 and holding portion H are rotated about their optical axes, the measurement wavefront changes. The change of the wavefront is a component which has changed following the rotation of the reflecting surface M1 and holding portion H, that is, the sum of the shape FMF of the reflecting surface M1 and the gravitational deformation FMG of the reflecting surface M1 caused by the holding portion H. A wavefront corresponding to the shape and gravitational deformation of the reflecting surface M1 can be separated from the measurement wavefront.

By comparing equations (1), (5), and (6), WR, WT, and (FMF+FMG) can be separated from the measurement wavefront in the first state ($\epsilon 1 = 90°$). Since the system errors of the reference optical system R (reference surface R2) and reflecting member M (reflecting surface M1) are separated, the measurement wavefront can be calibrated based on equation (4) to calculate the wavefront (wavefront aberration) of light traveling from the optical system T to be measured in the first state.

Figure 2D:
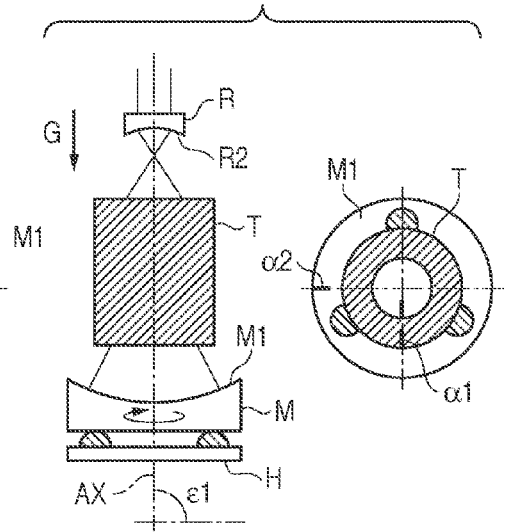

In S108 (fourth step), as shown in FIG. 2D, the reflecting surface M1 is rotated about its optical axis to measure a wavefront (fourth wavefront) W4 of light traveling from the optical system T to be measured while the measurement apparatus is maintained in the first state. More specifically, in S108, the angle of the optical system T to be measured about its optical axis, and that of the holding portion H about its optical axis are set to the first angle $\alpha 1$. The angle of the reflecting surface M1 about its optical axis is set to the second angle $\alpha 2$. The fourth wavefront W4 is given by $$W4 = 2WR + 2WT(\alpha 1) + 2(FMF(\alpha 2) + FMG(\alpha 1)) \tag{7}$$

The shape of the reflecting surface M1 is different between equations (1) and (7). Since the reflecting surface M1 is rotated about its optical axis, the measurement wavefront changes. The change of the wavefront is a component which has changed following the rotation of the reflecting surface M1, that is, the shape FMF of the reflecting surface M1. A wavefront corresponding to the shape of the reflecting surface M1 can be separated from the measurement wavefront. By comparing equations (1), (6), and (7), the shape FMF and gravitational deformation FMG unique to the reflecting surface M1 can be separated.

In the embodiment, the angle of the reflecting surface M1 about its optical axis is set to the second angle $\alpha 2$ in S108. However, the angle of the holding portion H about its optical axis may be set to the second angle $\alpha 2$. In this case, a change of the measurement wavefront is the gravitational deformation FMG of the shape of the reflecting surface M1. A wavefront corresponding to the gravitational deformation of the shape of the reflecting surface M1 can be separated from the measurement wavefront. It is also possible to set the angle of the reflecting surface M1 about its optical axis and that of the holding portion H about its optical axis to the second angle $\alpha 2$, measure wavefronts, and average the measurement wavefronts, thereby increasing the precision.

In S110 (fifth step), an error wavefront (wavefront aberration WR) arising from the reference surface R2, a wavefront (shape FMF) corresponding to the shape of the reflecting surface, and a wavefront (gravitational deformation FMG) corresponding to the gravitational deformation of the shape of the reflecting surface in the first state are calculated. As described above, these wavefronts can be calculated (separated) using the first wavefront W1 (equation (1)), second wavefront W2 (equation (5)), third wavefront W3 (equation (6)), and fourth wavefront W4 (equation (7)).

Figure 3A:
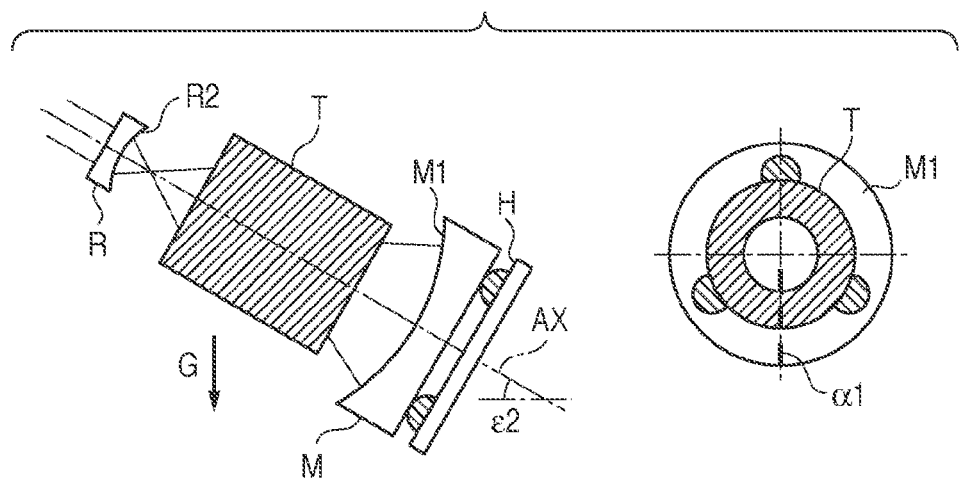
FIGS. 3A to 3D are schematic views showing states of the measurement apparatus used in the measurement method as one aspect of the present invention.

After that, the state of the measurement apparatus is changed from the first state to the second one. Note that the second state is a state where the attitude of the measurement apparatus is controlled so that the optical axes AX of the reflecting surface M1 and reference surface R2 do not coincide with the direction G of gravity, as shown in FIG. 3A. In the second state, an angle $\epsilon 2$ formed by the optical axis AX and a plane perpendicular to the direction G of gravity is an angle other than 90°. Measurement of the wavefront of light traveling from the optical system T to be measured in the second state will be explained by comparing a conventional technique with the present invention.

In the conventional technique, as shown in FIG. 3A, the measurement apparatus is set to the second state, the optical system T to be measured is arranged, and a wavefront Wa1 of light traveling from the optical system T to be measured is measured. In this case, the angle of the optical system T to be measured about its optical axis, that of the reflecting surface M1 about its optical axis, and that of the holding portion H about its optical axis are set to the first angle $\alpha 1$. The wavefront Wa1 is given by $$Wa1=2WR'+2WT'(\alpha 1)+2(FMF(\alpha 1)+FMG'(\alpha 1)) \qquad (8)$$

Compared with S102 to S108, the direction in which the gravity acts on the optical system T to be measured has changed, so the gravitational deformations of the optical system T to be measured, reference surface R2, and reflecting surface M1 change. By using the angle $\epsilon 2$, the gravity is divided into a gravity component mg·sin ($\epsilon 2$) which acts along the optical axis, and a gravity component mg·cos ($\epsilon 2$) which acts in a direction perpendicular to the optical axis. Note that the component which changes is the gravitational deformation. For example, the shape FMF unique to the reflecting surface M1 is determined by the angle of the reflecting surface M1 about its optical axis regardless of the direction G of gravity.

Figure 3B:
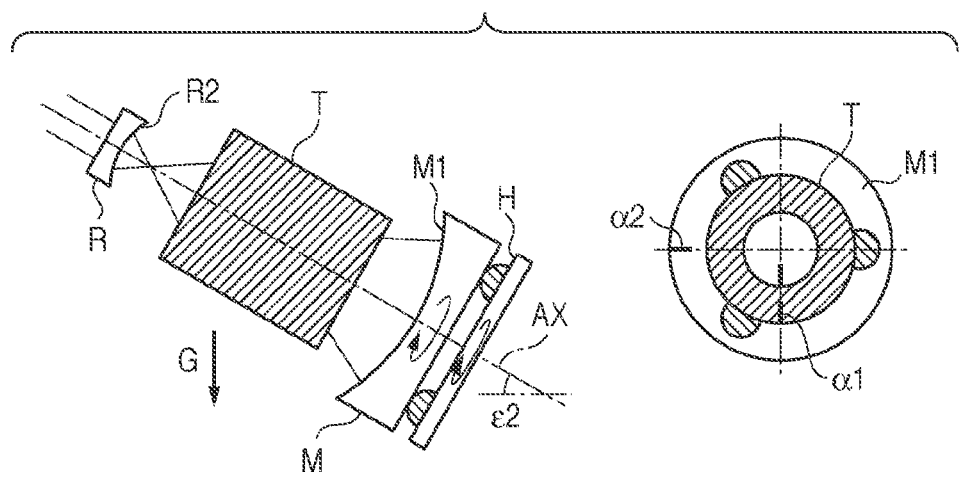

In the conventional technique, as shown in FIG. 3B, the reflecting surface M1 and holding portion H are rotated about their optical axes to measure a wavefront Wa2 of light traveling from the optical system T to be measured while the measurement apparatus is maintained in the second state. In this case, the angle of the optical system T to be measured about its optical axis is set to the first angle $\alpha 1$. The angle of the reflecting surface M1 about its optical axis, and that of the holding portion H about its optical axis are set to the second angle $\alpha 2$. The wavefront Wa2 is given by $$Wa2=2WR'+2WT'(\alpha 1)+2(FMF(\alpha 1)+FMG''(\alpha 2)) \qquad (9)$$

From a comparison between equations (8) and (9), the shape of the reflecting surface M1 changes following the rotation of the reflecting surface M1. However, the direction G of gravity is constant regardless of the angle of the reflecting surface M1 about its optical axis, and the gravitational deformation of the reflecting surface M1 does not follow the rotation of the reflecting surface M1 about its optical axis. Thus, the reflecting surface M1 generates a completely different gravitational deformation depending on the state of holding by the holding portion H.

In the conventional technique, the optical system T to be measured may be rotated about its optical axis to measure a wavefront Wa3 of light traveling from the optical system T to be measured, instead of rotating the reflecting surface M1 and holding portion H about their optical axes. In this case, the angle of the optical system T to be measured about its optical axis is set to the second angle $\alpha 2$. The angle of the reflecting surface M1 about its optical axis, and that of the holding portion H about its optical axis are set to the first angle $\alpha 1$. The wavefront Wa3 is given by $$Wa3=2WR'+2WT''(\alpha 2)+2(FMF(\alpha 1)+FMG(\alpha 1)) \qquad (10)$$

A comparison between equations (8) and (10) reveals that the gravitational deformation of the optical system T to be measured does not follow the rotation of the optical system T to be measured about its optical axis. For this reason, only the wavefront aberration of the optical system T to be measured cannot be separated from the measurement wavefront.

According to the conventional technique, the measurement wavefront in the second state can be separated only into WR+FMG', WT', and FMF. In other words, the system error of the reference optical system R (reference surface R2) caused by the gravitational deformation and that of the reflecting member M (reflecting surface M1) cannot be separated, failing to calibrate the measurement wavefront with high precision.

Figure 3C:
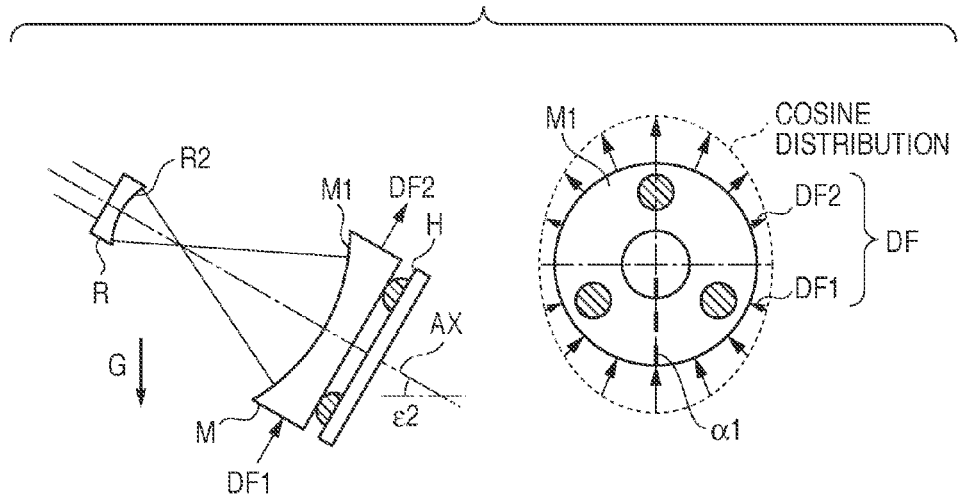

To solve this problem, according to the embodiment, in S112 (sixth step), as shown in FIG. 3C, the measurement apparatus is set to the second state, and a fifth wavefront W5 is measured using only the reference optical system R and reflecting member M without arranging the optical system T to be measured in the measurement apparatus. In S112, the angle of the reflecting surface M1 about its optical axis, and that of the holding portion H about its optical axis are set to the first angle $\alpha 1$. In S112, as shown in FIG. 3C, loads DF are added to the periphery of the reflecting member M so that they have a cosine distribution along the periphery of the reflecting member M in a plane which contains the center of gravity of the reflecting surface M1 and is perpendicular to the optical axis of the reflecting surface. More specifically, compression loads DF1 are added to a periphery of the reflecting member M on the side of the direction of gravity with respect to the optical axis of the reflecting surface M1. Tension loads DF2 are added to a periphery of the reflecting member M on a side opposite to the side of the direction of gravity with respect to the optical axis of the reflecting surface M1. Note that the sum of loads added to the periphery of the reflecting member M is set to be equal to the in-plane gravity component which acts on the reflecting surface M1. Accordingly, the gravitational deformation of the reflecting surface M1 by a gravity component which acts on the plane of the reflecting surface M1 can be reduced to a negligible degree. In contrast, a gravity component along the optical axis acts along the optical axis of the reflecting surface M1, so the reflecting surface M1 gravitationally deforms along the optical axis. At this time, the gravity component along the optical axis is mg·sin ($\epsilon 2$), as described above. The gravitational deformation FMG' of the reflecting surface M1 is given by $$FMG'=FMG\cdot\sin(\epsilon 2) \qquad (11)$$

In the embodiment, when the measurement apparatus changes from the first state ($\epsilon 1=90°$), the gravitational deformation is linear with respect to the deformation in the first state. The deformation amount is determined by the change amount (difference between $\epsilon 1$ and $\epsilon 2$) from the first state to the second state. Thus, the fifth wavefront W5 is given by $$W5=2WR'+2(FMF(\alpha 1)+FMG(\alpha 1)\cdot\sin(\epsilon 2)) \qquad (12)$$

Referring to equation (12), FMF($\alpha 1$) and FMG($\alpha 1$) are obtained in S106 (equation (6)) and S108 (equation (7)), as described above. The wavefront WR' of the reference optical system R in the second state can be separated from the measurement wavefront.

Figure 3D:
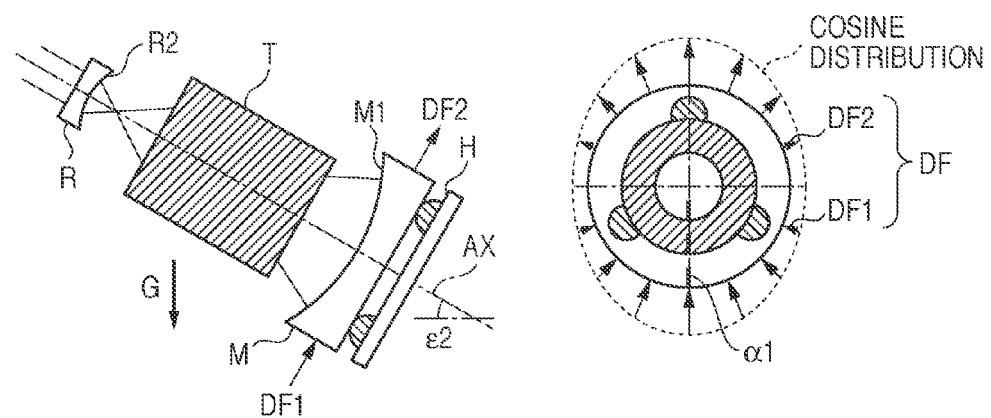

In S114 (seventh step), as shown in FIG. 3D, the optical system T to be measured is arranged in the measurement apparatus so that its optical axis does not coincide with the direction of gravity, while the measurement apparatus is maintained in the second state. Then, a wavefront (sixth wavefront) W6 of light traveling from the optical system T to be measured is measured. In S114, the angle of the optical system T to be measured about its optical axis, that of the reflecting surface M1 about its optical axis, and that of the holding portion H about its optical axis are set to the first angle α1. Similar to S112, the loads DF (compression loads DF1 and tension loads DF2) are added to the periphery of the reflecting member M so that the loads have a cosine distribution along the periphery of the reflecting member M in a plane which contains the center of gravity of the reflecting surface M1 and is perpendicular to the optical axis of the reflecting surface. By using equation (11), the sixth wavefront W6 is given by $$W6 = 2WR' + 2WT'(\alpha 1) + 2(FMF(\alpha 1) + FMG(\alpha 1) \cdot \sin(\epsilon 2)) \quad (13)$$

In S112 and S114, the loads DF are added to the periphery of the reflecting member M (reflecting surface M1). Alternatively, the loads DF may be added to the reference optical system R (reference surface R2).

In S116 (eighth step), the wavefront of light traveling from the optical system T to be measured in the second state is calculated using equations (12) and (13). More specifically, the wavefront $FMF(\alpha 1)$ corresponding to the shape of the reflecting surface M1, and the wavefront $FMG(\alpha 1)$ corresponding to the gravitational deformation of the shape of the reflecting surface M1 that have been calculated in S110 are separated from the fifth wavefront W5, thereby calculating the wavefront error WR' arising from the reference optical system R in the second state. Then, the wavefront error arising from the reference optical system R in the second state is separated from the sixth wavefront W6, thereby calculating the wavefront WT' (α1) of light traveling from the optical system T to be measured in the second state.

In this manner, according to the measurement method of the embodiment, even when the optical axis of the optical system T to be measured does not coincide with the direction G of gravity, the system errors of the reference optical system R (reference surface R2) and reflecting member M (reflecting surface M1) can be separated to measure the wavefront of light traveling from the optical system T to be measured with high precision.

FIGS. 4A to 4D are schematic views of a measurement apparatus (first embodiment) used in the measurement method of the embodiment. A measurement apparatus 1 will be explained in detail with reference to FIGS. 4A to 4D. The measurement apparatus 1 includes a light source 10, half mirror 20, reference optical system 30, reflecting member 40, holding portion 50, detecting portion 60, load adding portion 70, and control unit 80. The measurement apparatus 1 may further include a beam expander which expands the diameter of light incident on the optical system T to be measured, and a wavefront conversion element which converts light reflected by a reference surface 32 into a wavefront suited to the optical system T to be measured.

Light emitted by the light source 10 passes through the half mirror 20 and enters the reference optical system 30 having the reference surface 32. The light which has entered the reference surface 32 is split into light reflected by the reference surface 32 and one which passes through the reference surface 32.

The light which has passed through the reference surface 32 passes through the optical system T to be measured and is reflected by a reflecting surface 42 of the reflecting member 40. Note that the reflecting member 40 is held by the holding portion 50 and arranged so that its optical axis coincides with that of the reference optical system 30. The light reflected by the reflecting surface 42 passes again through the optical system T to be measured, and enters the reference surface 32. The light is then reflected by the half mirror 20, and enters the detecting portion 60. To the contrary, the light which has been reflected by the reference surface 32 is reflected by the half mirror 20 and enters the detecting portion 60.

An interference pattern formed by the light reflected by the reflecting surface 42 and that reflected by the reference surface 32 is detected on the detecting surface of the detecting portion 60. The control unit 80 controls an operation for measuring the wavefront (wavefront aberration) of light traveling from the optical system T to be measured. The control unit 80 also performs processing for calculating the wavefront of light traveling from the optical system T to be measured, based on the interference pattern detected by the detecting portion 60. In other words, the control unit 80 comprehensively controls all the portions of the measurement apparatus 1 to execute the measurement method (S102 to S116) of the embodiment.

Figure 4A:
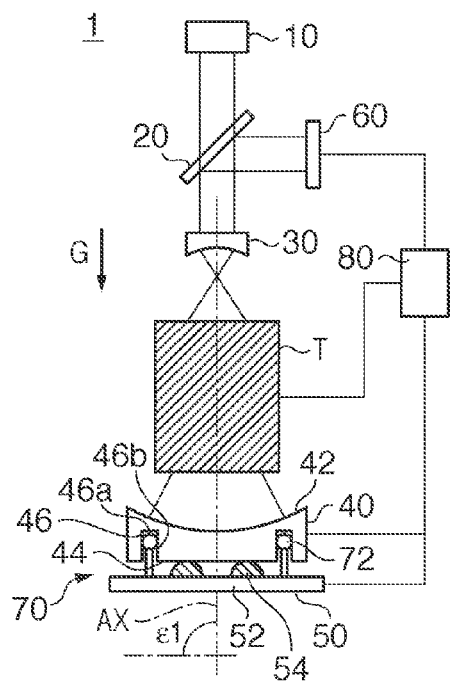
FIGS. 4A to 4D are schematic views showing the arrangement of the first embodiment of a measurement apparatus as another aspect of the present invention.

Holding of the reflecting member 40 by the holding portion 50 and load adding portion 70 in the measurement apparatus 1 will be explained. As shown in FIG. 4A, the reflecting member 40 has a groove 46 which is formed in a lower surface 44 of the reflecting surface 42 in a circular shape centered on the optical axis AX of the reflecting surface 42 and extends deep along the optical axis of the reflecting surface 42. The holding portion 50 includes a holding plate 52 and holding members 54 which are formed on the holding plate 52 and contact the lower surface 44 of the reflecting surface 42. The holding portion 50 holds the reflecting member 40 from the lower surface 44 of the reflecting surface 42. Note that the holding members 54 are configured to transfer a force (force for holding the reflecting member 40) to only portions of the lower surface 44 of the reflecting surface 42 that are in contact with the holding members 54, while decreasing an in-plane frictional force at portions in contact with the lower surface 44 to a negligible degree. For example, the holding members 54 are made of a low-friction material such as Teflon®.

Figure 4B:
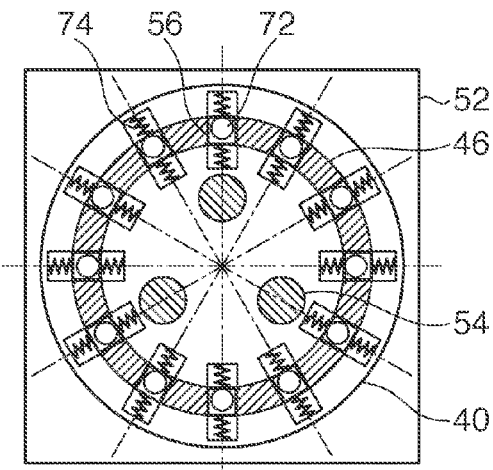

The load adding portion 70 has a function of adding loads to the periphery of the reflecting member 40. The load adding portion 70 includes, for example, a plurality of contact members 72 which are inserted into the groove 46 of the lower surface 44 of the reflecting surface 42, and a plurality of elastic members 74 (to be described later). When the holding portion 50 holds the reflecting member 40, the contact members 72 contact not a surface 46a of the groove 46 that is along the optical axis AX, but a surface 46b of the groove 46 that is perpendicular to the optical axis AX. Note that the contact members 72 are configured to transfer a force to only the surface 46b of the groove 46 while decreasing an in-plane frictional force at portions in contact with the surface 46b of the groove 46 to a negligible degree. For example, the contact members 72 are made of a low-friction material such as Teflon®. It suffices to configure the contact members 72 so that they contact the surface 46b of the groove 46 in a plane which contains the center of gravity of the reflecting surface 42 and is perpendicular to the optical axis of the reflecting surface 42. In the embodiment, the contact members 72 are arranged at 30° pitches, as shown in FIG. 4B. However, the number and pitch of the contact members 72 can be arbitrarily set.

As shown in FIG. 4B, the contact members 72 can be moved along linear guides 56, which are disposed on the holding plate 52 in the radial direction of the reflecting surface 42. For example, the contact members 72 are connected to the holding plate 52 (linear guides 56) via the elastic members 74 formed from, for example, springs. All the elastic members 74 connected to the contact members 72 have a uniform spring constant k. Note that the contact members 72 may be pushed against the surface 46b of the groove 46 to the extent to which their shapes do not change.

In the embodiment, the degree of freedom of the reflecting surface 42 (reflecting member 40) about its optical axis is not restricted (that is, can be rotated about the optical axis), and in some cases, the position of the reflecting member 40 cannot be determined. In this case, the rotation of the reflecting surface 42 about its optical axis may be restricted by forming, for example, an orientation flat on the reflecting member 40, or a V-groove serving as a reference in the groove 46.

When the measurement apparatus 1 is in the first state, that is, the angle $\epsilon 1$ formed by the optical axis AX and a plane perpendicular to the direction G of gravity is 90°, only the holding portion (holding members 54) stands against the gravity acting on the reflecting member 40. At this time, only a frictional force or low pressure is generated at the holding members 54, and the influence of the holding members 54 on the shape of the reflecting surface 42 is negligibly small. Letting FMF1 be a shape unique to the reflecting surface 42 and FMG1 be the gravitational deformation of the reflecting surface 42, the shape FM1 of the reflecting surface 42 is given by $$FM1 = FMF1 + FMG1 \tag{14}$$

Figure 4C:
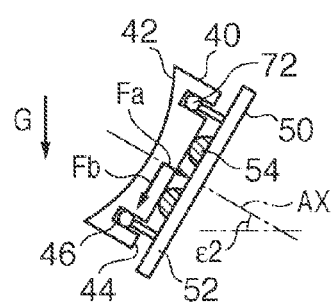

A case in which the measurement apparatus 1 is in the second state, that is, the angle $\epsilon 2$ formed by the optical axis AX and a plane perpendicular to the direction G of gravity is an angle other than 90°, as shown in FIG. 4C, will be examined. In this case, the gravity acting on the reflecting member 40 is divided into a gravity component Fa along the optical axis of the reflecting surface 42 and a gravity component Fb in a direction perpendicular to the optical axis. The gravity components Fa and Fb are given by $$Fa = mg \cdot \sin(\epsilon 2) \tag{15}$$

$$Fb = mg \cdot \cos(\epsilon 2) \tag{16}$$

Figure 4D:
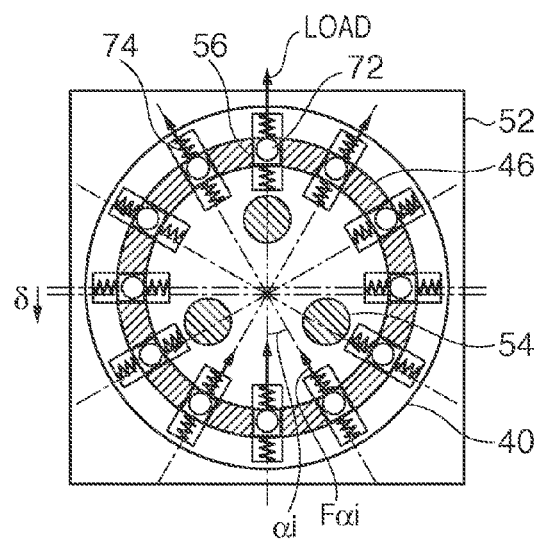

The holding members 54 stand against the gravity component Fa, and the contact members 72 stand against the gravity component Fb. If the reflecting member 40 moves only by the moving amount $\delta$ in a direction in which the gravity component Fb acts, as shown in FIG. 4D, arbitrary contact members 72 add, to the reflecting member 40, loads corresponding to the displacement of the elastic members 74 upon the movement of the contact members 72. A load F$\alpha$i added by an arbitrary contact member 72 at an angle $\alpha$i about the optical axis using, as a reference, a direction in which the gravity component acts is given by $$F\alpha i = k\delta \cdot \cos \alpha i \tag{17}$$

Since the load F$\alpha$i is positive in a direction toward the center of the reflecting surface 42, loads added to the reflecting member 40 have a cosine distribution (or a distribution approximate to a cosine distribution) along the periphery of the reflecting member 40. Based on the fact that the sum of components opposing the gravity component Fb among loads added by n contact members 72 balances with the gravity component Fb, we have $$\sum_{i=1}^{n} k\delta \cdot \cos^2(\alpha i) = mg \cdot \cos(\epsilon 2) \tag{18}$$

If equation (18) is satisfied, loads added by the contact members 72 make a load in a plane of the reflecting surface 42 perpendicular to the optical axis balance with the gravity component Fb, thereby reducing the gravitational deformation of the reflecting surface 42. From the foregoing equations, the spring constant k of the contact members 72 and the moving amount $\delta$ of the reflecting member 40 are uniquely determined. The spring constant k of the contact members 72 can be determined from the allowable shift amount of the reflecting member 40 from the alignment, that is, the moving amount.

The reflecting surface 42 deforms by the gravity along the optical axis owing to the gravity component Fa. However, this gravitational deformation is linear with respect to the reference (first state), and the ratio is 1:sin ($\epsilon 2$). In the system error of the reflecting member 40, the gravitational deformation FMG1' of the reflecting surface 42 in the second state is sin ($\epsilon 2$) times larger than the gravitational deformation FMG1 of the reflecting surface 42 in the first state:

$$FMG1' = FMG1 \cdot \sin(\epsilon 2) \tag{19}$$

A system error arising from a shape unique to the reflecting surface 42 is constant regardless of the direction G of gravity. The system error WM1 arising from the reflecting surface 42 can be given by $$WM1 = 2FM1 = 2(FMF1 + FMG \cdot \sin(\epsilon 2)) \tag{20}$$

By using the system error WM1, the measurement wavefront can be calibrated.

FIGS. 5A to 5D are views showing the results of analyzing the effect of holding the reflecting member 40 by the holding portion 50 and load adding portion 70 (that is, reduction of the gravitational deformation of the reflecting surface 42) in the embodiment. FIGS. 5A, 5B, and 5C show loads added to the reflecting member 40 when two contact members 72 are arranged in the direction of gravity, six contact members 72 are arranged at 60° pitches, and 12 contact members 72 are arranged at 30° pitches, respectively. FIG. 5D shows the difference [nmRMS] between the gravitational deformation amount of the reflecting surface 42 in the first state ($\epsilon 1 = 90°$) and that of the reflecting surface 42 in the second state ($\epsilon 2 = 30°$. For $\epsilon 2 = 30°$, sin 30° = 0.5, and the gravitational deformation of the reflecting surface 42 is assumed to be ½ of that for $\epsilon 1 = 90°$ because the holding portion 50 and load adding portion 70 hold the reflecting member 40 in the embodiment. The holding members 54 are arranged at 120° pitches.

Referring to FIG. 5D, the difference in gravitational deformation amount is 21 nmRMS when two contact members 72 are arranged in the direction of gravity, 3.1 nmRMS when six contact members 72 are arranged at 60° pitches, and 1.7 nmRMS when 12 contact members 72 are arranged at 30° pitches. In this way, as the number of contact members 72 increases, the difference in gravitational deformation amount is reduced much more.

Note that the load applied to one contact member 72 increases as the number of contact members 72 decreases. When the reflecting member 40 is made of a brittle material such as glass or ceramic, the number of contact members 72 needs to be set not to generate a stress large enough to break the reflecting member 40.

Modifications of the load adding portion 70 will be explained with reference to FIGS. 6A to 6F. A load adding portion 70 shown in FIG. 6A includes first contact members 72A for adding a tension load toward the optical axis of the reflecting surface 42, and second contact members 72B for adding a compression load toward the optical axis of the reflecting surface 42. The second contact members 72B are not inserted in the groove 46 but are in contact with the periphery of the reflecting member 40. The load adding portion 70 shown in FIG. 6A can add a compression load by the second contact members 72B from the periphery of the reflecting member 40. Loads added to the reflecting member 40 can have an almost ideal cosine distribution.

Figure 6A:
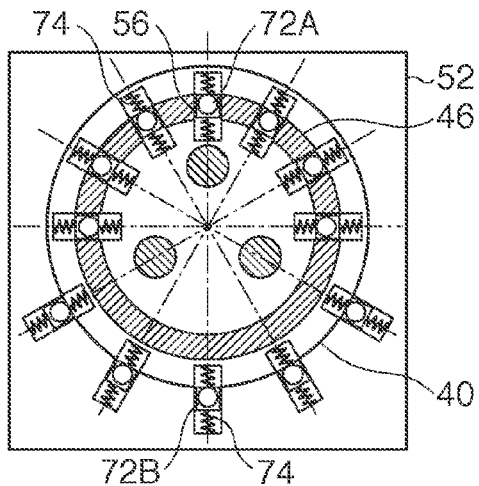
FIGS. 6A to 6F are schematic views exemplifying arrangements of the load adding portion of the measurement apparatus shown in FIGS. 4A to 4D.
Figure 6B:
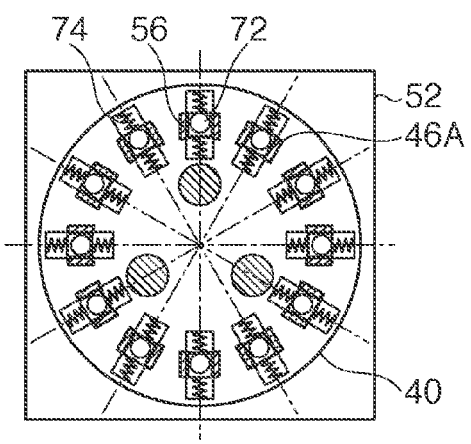

In a load adding portion 70 shown in FIG. 6B, the contact members 72 are inserted into respective grooves 46A formed in the lower surface 44 of the reflecting surface 42. The grooves 46A are formed in a plurality of regions (that is, intermittently) defined on a circle centered on the optical axis of the reflecting surface 42. The load adding portion 70 shown in FIG. 6B can suppress reduction of the rigidity of the reflecting member 40 that is caused by forming the grooves 46A, and can decrease the possibility that the reflecting member 40 may break by adding loads.

Figure 6C:
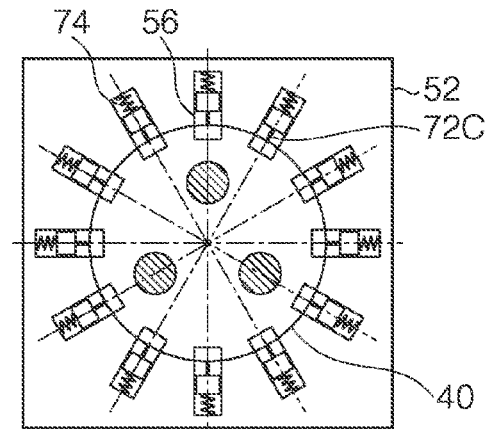

A load adding portion 70 shown in FIG. 6C includes contact members 72C which contact holes formed at the periphery of the reflecting member 40, and the elastic members 74 which are connected to the contact members 72C. The contact member 72C is formed from, for example, a filler metal, and a connection member which connects the filler metal and the elastic member 74. The load adding portion 70 shown in FIG. 6C can add a compression load by the contact members 72C from the periphery of the reflecting member 40. Loads added to the reflecting member 40 can have an almost ideal cosine distribution.

Figure 6D:
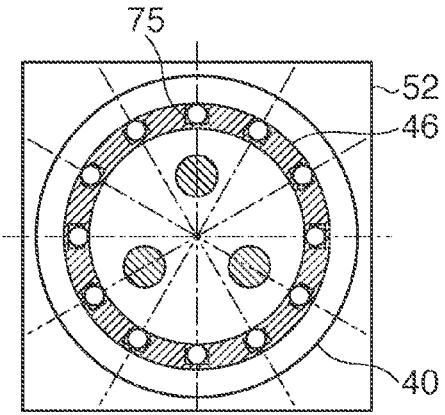

A load adding portion 70 shown in FIG. 6D includes a plurality of leaf springs 75 which are inserted into the groove 46, and contact not a surface of the groove 46 along the optical axis but a surface of the groove 46 perpendicular to the optical axis when the holding portion 50 holds the reflecting member 40. The leaf springs 75 are disposed on the holding plate 52, and their spring constant in the radial direction of the reflecting surface 42 is determined. More specifically, in the second state, the leaf springs 75 add a compression load to a periphery of the reflecting surface 42 on the side of the direction of gravity with respect to the optical axis, and a tension load to a periphery of the reflecting surface 42 on a side opposite to the side of the direction of gravity with respect to the optical axis.

Figure 6E:
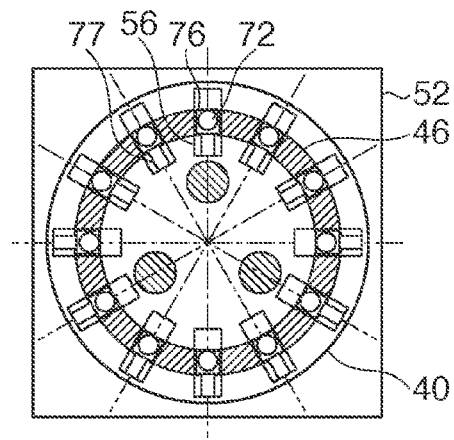

A load adding portion 70 shown in FIG. 6E includes a plurality of contact members 72, and a plurality of actuators 76 which are connected to the respective contact members 72. The actuator 76 is formed from a servomotor, piezoelectric element, or the like. In the second state, the actuators 76 add a compression load to a periphery of the reflecting surface 42 on the side of the direction of gravity with respect to the optical axis, and a tension load to a periphery of the reflecting surface 42 on a side opposite to the side of the direction of gravity with respect to the optical axis. The load adding portion 70 may include load detecting portions 77 which detect loads added by the actuators 76 to the reflecting member 40. Based on the detection results of the load detecting portions 77, the actuators 76 can be controlled so that loads added to the reflecting member 40 in a plane which contains the center of gravity of the reflecting surface 42 and is perpendicular to the optical axis of the reflecting surface 42 have a cosine distribution along the periphery of the reflecting member 40. This control may be executed by the control unit 80 or an actuator control unit arranged separately from the control unit 80. The load detecting portion 77 is formed from, for example, a load cell.

Figure 6F:
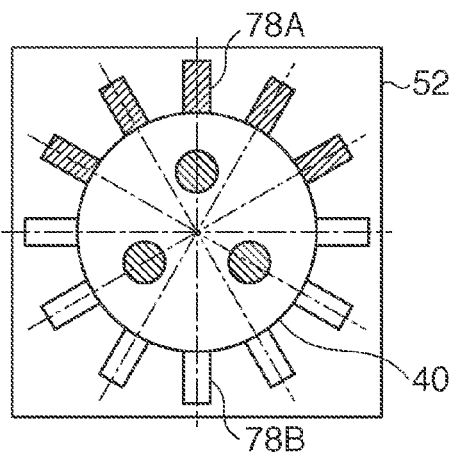

A load adding portion 70 shown in FIG. 6F includes first pressure portions 78A and second pressure portions 78B which contact the periphery of the reflecting member 40 to add a load to the periphery of the reflecting member 40 by a pressure. The first pressure portions 78A suck the periphery of the reflecting member 40 by low-pressure air, adding a tension load. The second pressure portions 78B blow high-pressure air to the periphery of the reflecting member 40, adding a compression load. More specifically, in the second state, the first pressure portions 78A and second pressure portions 78B add a compression load to a periphery of the reflecting surface 42 on the side of the direction of gravity with respect to the optical axis, and a tension load to a periphery of the reflecting surface 42 on a side opposite to the side of the direction of gravity with respect to the optical axis. The load adding portion 70 may include load detecting portions which detect loads added to the reflecting member 40 by the first pressure portions 78A and second pressure portions 78B. Based on the detection results of the load detecting portions, the first pressure portions 78A and second pressure portions 78B can be controlled so that loads added to the reflecting member 40 in a plane which contains the center of gravity of the reflecting surface 42 and is perpendicular to the optical axis of the reflecting surface 42 have a cosine distribution along the periphery of the reflecting member 40. This control may be executed by the control unit 80 or a pressure control unit arranged separately from the control unit 80.

Figure 7:
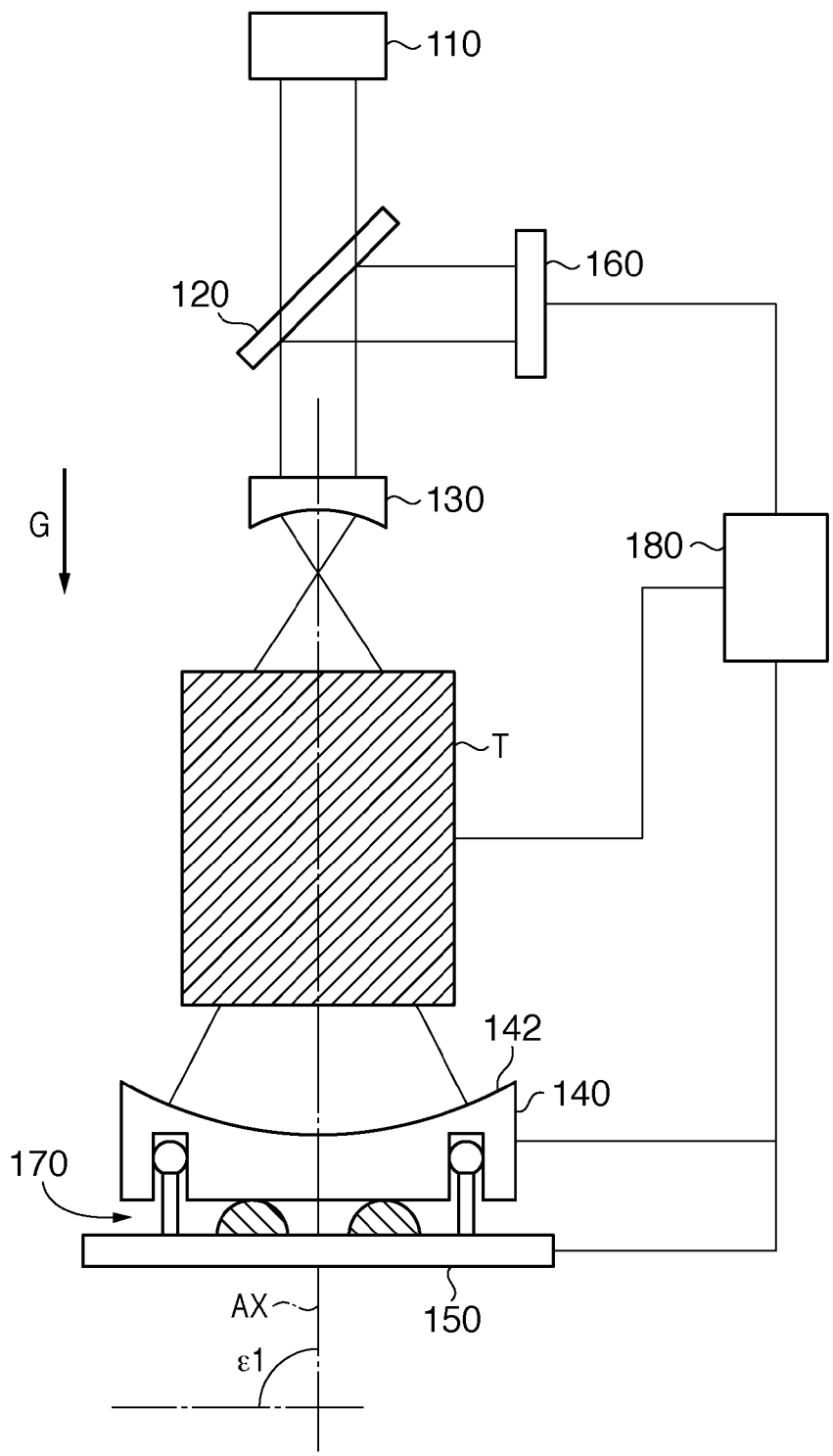
FIG. 7 is a schematic view showing the arrangement of the second embodiment of a measurement apparatus as another aspect of the present invention.

Note that the measurement apparatus 1 has a general interferometer arrangement, but is also applicable to an arrangement using a wavefront sensor such as a Shack-Hartmann sensor, as shown in FIG. 7. FIG. 7 is a schematic view of a measurement apparatus (second embodiment) used in the measurement method of the embodiment.

A measurement apparatus 100 will be described in detail with reference to FIG. 7. The measurement apparatus 100 includes a light source 110, half mirror 120, wavefront conversion element 130, reflecting member 140, holding portion 150, Shack-Hartmann sensor 160, load adding portion 170, and control unit 180.

Light emitted by the light source 110 passes through the half mirror 120 and enters the wavefront conversion element 130 (measurement optical system). The light having passed through the wavefront conversion element 130 passes through an optical system T to be measured, and is reflected by a reflecting surface 142 of the reflecting member 140. Note that the reflecting member 140 is held by the holding portion 150 and arranged so that its optical axis coincides with that of the wavefront conversion element 130. The light reflected by the reflecting surface 142 passes again through the optical system T to be measured, and enters the wavefront conversion element 130. The light is then reflected by the half mirror 120, and enters the Shack-Hartmann sensor 160.

The Shack-Hartmann sensor 160 detects the wavefront of the light reflected by the reflecting surface 142 as the lateral shift amount of the imaging position of each microlens via a microlens array (not shown). The control unit 180 controls an operation for measuring the wavefront (wavefront aberration) of light traveling from the optical system T to be measured. The control unit 180 also performs processing for calculating the wavefront of light traveling from the optical system T to be measured, based on the lateral shift amount of the imaging position that is detected by the Shack-Hartmann sensor 160. In other words, by using the Shack-Hartmann sensor in place of the interferometer arrangement, the control unit 180 comprehensively controls all the portions of the measurement apparatus 100 to execute the measurement method (S102 to S116) of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-191474 filed on Aug. 20, 2009, which is hereby incorporated by reference herein in its entirety.

What is claimed is:

1. An apparatus which measures a wavefront aberration of an optical system, the apparatus comprising:
   a reflector configured to reflect a light traveling from the optical system, an angle of an optical axis of the reflector being variable relative to a gravity direction;
   a measurement optical system configured to include one of a reference surface or a wavefront conversion element;
   a detector configured to detect a light incident thereon via the reflector and the measurement optical system including the one of the reference surface or the wavefront conversion element; and
   a load application device configured to:
      apply a load to the reflector in an application direction perpendicular to the optical axis, the load application device applying a compression load to a first portion of the reflector below the optical axis, at a magnitude corresponding to the angle and a position of the first portion, in the application direction thereat; and
      apply a tension load to a second portion of the reflector above the optical axis, at a magnitude corresponding to the angle and a position of the second portion, in the application direction thereat.

2. The apparatus according to claim 1, wherein:
   the reflector has a groove which is formed in a surface of the reflector opposite to a reflecting surface of the reflector and in a circular shape centered on the optical axis, and
   the load application device is configured to apply the load to the reflector via a side of the groove.

3. The apparatus according to claim 2, wherein the groove is configured as grooves which are formed in a plurality of discrete regions.

4. The apparatus according to claim 2, wherein the load application device includes:
   a contact member configured to contact the side of the groove; and
   an actuator configured to apply a force to the contact member in the application direction.

5. The apparatus according to claim 4, wherein the actuator include an elastic member.

6. The apparatus according to claim 4, wherein the load application device includes:
   a load detector configured to detect a load added by the actuator to the side of the groove; and
   a controller configured to control the actuator based on the detected load.

7. A method of measuring a wavefront aberration of an optical system using a reflector configured to reflect a light traveling from the optical system, an angle of an optical axis of the reflector being variable relative to a gravity direction; a measurement optical system configured to include one of a reference surface or a wavefront conversion element; and a detector configured to detect a light incident thereon via the reflector and the measurement optical system including the one of the reference surface or the wavefront conversion element, the method comprising:
   applying a load to the reflector in an application direction perpendicular to the optical axis, a compression load being applied to a first portion of the reflector below the optical axis, at a magnitude corresponding to the angle and a position of the first portion, in the application direction thereat; and
   applying a tension load to a second portion of the reflector above the optical axis, at a magnitude corresponding to the angle and a position of the second portion, in the application direction thereat.

* * * * *